United States Patent
Wnuk

(10) Patent No.: US 9,984,473 B2
(45) Date of Patent: May 29, 2018

(54) FEATURE TRACKABILITY RANKING, SYSTEMS AND METHODS

(71) Applicant: Nant Holdings IP, LLC, Culver City, CA (US)

(72) Inventor: Kamil Wnuk, Playa del Rey, CA (US)

(73) Assignee: Nant Holdings IP, LLC, Culver City, CA (US)

( * ) Notice: Subject to any disclaimer, the term of this patent is extended or adjusted under 35 U.S.C. 154(b) by 359 days.

(21) Appl. No.: 14/795,515

(22) Filed: Jul. 9, 2015

(65) Prior Publication Data
US 2016/0012597 A1    Jan. 14, 2016

Related U.S. Application Data

(60) Provisional application No. 62/022,558, filed on Jul. 9, 2014.

(51) Int. Cl.
G06T 7/246 (2017.01)

(52) U.S. Cl.
CPC .... G06T 7/246 (2017.01); *G06T 2207/10016* (2013.01); *G06T 2207/20081* (2013.01); *G06T 2207/20164* (2013.01); *G06T 2207/30241* (2013.01)

(58) Field of Classification Search
None
See application file for complete search history.

(56) References Cited

U.S. PATENT DOCUMENTS

| | | |
|---|---|---|
| 6,618,490 B1 | 9/2003 | Cham et al. |
| 6,795,567 B1 | 9/2004 | Cham et al. |
| 2013/0215264 A1 | 8/2013 | Soatto et al. |
| 2013/0287256 A1 | 10/2013 | Narasimha et al. |

(Continued)

FOREIGN PATENT DOCUMENTS

EP    2 339 537 A1    6/2011

OTHER PUBLICATIONS

Li et al., "Rank-SIFT: Learning to Rank Repeatable Local Interest Points", Computer Vision and Pattern Recognition (CVPR), IEEE, 2011, pp. 1737-1744.

(Continued)

*Primary Examiner* — Matthew Bella
*Assistant Examiner* — Brian Shin
(74) *Attorney, Agent, or Firm* — Mauriel Kapouytian Woods LLP; Andrew A. Noble; Michael Mauriel

(57) ABSTRACT

Image feature trackability ranking systems and methods are disclosed. A method of establishing a trackability ranking order from tracked image features within a training video sequence at a tracking analysis device includes establishing a tracking region within the training video sequence using a feature detection algorithm. Trajectories of tracked image features within the tracking region are compiled using a feature tracking algorithm. Saliency metrics are assigned to each one of the trajectories of tracked image features based on one or more feature property measurements within the tracking region, and a trackability ranking algorithm that is a function of the saliency metrics and a defined feature trajectory ranking associated with the training video sequence is determined, the trackability ranking algorithm being usable for ranking, based on trackability, tracked image features within another video sequence.

38 Claims, 10 Drawing Sheets

(56) References Cited

U.S. PATENT DOCUMENTS

2014/0063275 A1* 3/2014 Krahenbuhl ......... H04N 19/117
348/208.4
2014/0328570 A1* 11/2014 Cheng ................... G11B 27/10
386/241

OTHER PUBLICATIONS

Hartmann et al., "Predicting Matchability", Computer Vision and Pattern Recognition (CVPR), IEEE, 2014, 8 pages.
Joachims, "Training Linear SVMs in Linear Time", KDD '06 Proceedings of the 12th ACM SIGKDD international conference on Knowledge discovery and data mining, 10 pages.
Joachims, "Optimizing Search Engines using Clickthrough Data", KDD '02 Proceedings of the eighth ACM SIGKDD international conference on Knowledge discovery and data mining, 10 pages.
Vedaldi et al., "Efficient Additive Kernels via Explicit Feature Maps", IEEE Transactions on Pattern Analysis and Machine Intelligence, Jun. 2011, 14 pages.

* cited by examiner

FEATURE TRACKABILITY RANKING, SYSTEMS AND METHODS

CROSS REFERENCE TO RELATED APPLICATIONS

This application claims the benefit of U.S. Provisional Application No. 62/022,558, filed Jul. 9, 2014. The entire content of that application is hereby incorporated herein by reference.

TECHNICAL FIELD

This disclosure relates generally to image-based object tracking technologies.

BACKGROUND

The background description includes information that may be useful in understanding the present invention. It is not an admission that any of the information provided herein is prior art or relevant to the presently claimed invention, or that any publication specifically or implicitly referenced is prior art.

Tracking objects in video streams requires detecting trackable image features in the video data, then detecting movement of the image features from one frame of the video to another. Feature detection algorithms can be quite slow relative to the typical frame rate of video streams. As the frame rate increases or the frame size increases, the feature detection algorithms and tracking algorithms can become computationally bound. In such cases, image features cannot be tracked at high frame rates, which reduces tracking fidelity. Additionally, typical feature detection algorithms are based on properties of static images that are independent of the tracking algorithm applied.

SUMMARY

It would be useful for a feature tracking device to be able to determine which image features are most suitable for tracking in order to select an optimal subset of available image features for tracking at any given time. Additionally, it would be useful rank image features to be used for tracking according to how well image features with certain image properties track in practice.

Previously, others have put forth some effort toward determining how to rank image features for tracking. For example, U.S. patent application publication no. 2013/0287256 to Narashima et al., titled "Method and System for Real-Time Image Recognition on a Mobile Device" (filed Apr. 29, 2013), describes ranking features points to determine which features are stable in an image. However, the Narashima approach occurs during the act of image recognition, which further increases the computational cost to the device.

Another example includes European patent application publication no. EP 2 339 537 to BenHimane et al., titled "Method of Determining Reference Features for use in an Optical Object Initialization Tracking Process and Object Initialization Tracking Method" (filed Dec. 23, 2009). The BenHimane approach compares current image features to reference image features for object tracking. However, the BenHimane approach only describes an object-specific training procedure for selecting reference features for a single target object. Also, the BenHimane approach fails to appreciate that features matched from a static image can behave differently when tracked continuously through time.

Other examples of previous attempts to rank features for tracking include:
- U.S. Pat. No. 6,618,490 to Cham et al., titled "Method of Efficiently Registering Object Models in Image via Dynamic Ordering or Features" (filed Dec. 20, 1999);
- U.S. Pat. No. 6,795,567 to Cham et al., titled "Methods for Efficiently Tracking Object Models in Video Sequences via Dynamic Ordering of Features" (filed May 5, 2000); and
- U.S. patent application publication no. 2013/0215264 to Soatto et al. titled "End-to-End Visual Recognition Systems and Methods" (filed Jan. 7, 2013).

While each of these methods relate to selecting reference features, they do not adequately address analyzing image feature properties to determine, for example, how well the image features may be tracked through a video sequence. Further, the current methods of selecting reference features do not include analyzing image feature properties to determine a trackability ranking algorithm (i.e., a ranking strategy) through which only selected image features of relevance are tracked (e.g., features that satisfy a trackability ranking threshold), thereby reducing computational overhead and increasing tracking efficiency, e.g., with respect to frame rate.

Thus, there is still a need for computationally efficient methods that allow for determining image feature trackability, and for determining ranking strategies based on image feature trackability. The inventive subject matter provides apparatuses, systems and methods in which image features can be analyzed to determine trackability. The trackability information can be leveraged to establish a trackability ranking algorithm/ranking strategy through which selected features can be tracked in query video sequences.

In an embodiment, a method of establishing a trackability ranking order from tracked image features within a training video sequence at a tracking analysis device includes establishing a tracking region within a training video sequence using a feature detection algorithm. The training video sequence may comprise at least one of stereoscopic, motion-capture, time-lapsed, 3D and computer-rendered video data. The tracking region may span across multiple frames of the training video sequence. Establishing the tracking region may include locating the tracking region based on at least one image feature identified using the feature detection algorithm. The feature detection algorithm may comprise at least one of a features from accelerated segment test (FAST) algorithm, Harris corner algorithm, difference of Gaussian algorithm, level curve curvature algorithm, Laplacian of Gaussian algorithm, determinant of Hessian algorithm and maximally stable extremal regions (MSER) algorithm. Trajectories of tracked image features are compiled within the tracking region using a feature tracking algorithm. Saliency metrics are assigned to each one of the trajectories of tracked image features based on one or more feature property measurements within the tracking region, and a trackability ranking algorithm that is a function of the saliency metrics and a defined feature trajectory ranking associated with the training video sequence is determined, the trackability ranking algorithm being usable for ranking, based on trackability, tracked image features within another video sequence.

In some embodiments, the multiple frames of the training video sequence may comprise at least two sequential frames.

In some embodiments, the tracking region may comprise an image patch in at least one frame of the training video sequence, or a set of image patches that includes the image patch. The set of image patches may represent the image patch over a time interval.

In some embodiments, the tracking region may comprise at least a 3D region of the training video sequence, wherein the 3D region includes a time dimension, or at least a 4D region of the training video sequence, wherein the 4D region includes a depth dimension.

In some embodiments, the tracked image features may be identified according to an additional feature detection algorithm. The additional feature detection algorithm may be different from the feature detection algorithm used for establishing the tracking region within the training video sequence, and may comprise at least one a difference of Gaussian algorithm, Harris algorithm, FAST algorithm, edge detection algorithm, level curve curvature algorithm, Laplacian of Gaussian algorithm, determinant of Hessian algorithm and MSER algorithm.

In some embodiments, the defined feature trajectory ranking may be based on at least one of a track length, tracking error, tracking path, track depth of one or more training image features within the training video sequence, a number of frames, a length of time, an error, a confidence level, a momentum, a curvature, a patch count, a measure of photometric variance over time, and a line-of-sight measure.

In some embodiments, the trackability ranking algorithm comprises a linear ranking function, and the ordering of tracked image features may comprise sorting trajectories by a result of a linear combination of the saliency metrics. The linear ranking function may be learned using a ranking support vector machine (SVM).

In some embodiments, the linear ranking function may operate on a vector of saliency metrics expanded via a kernel map.

In some embodiments, the trackability ranking algorithm may comprise a multi-dimensional ranking function. The multi-dimensional ranking function may be learned using a ranking support vector machine (SVM).

In some embodiments, a trajectory of a tracked image feature may include at least one of a number of frames, a length of time, an error, a confidence level, a momentum, a curvature, a patch count, a measure of photometric variance over time, and a line-of-sight measure.

In some embodiments, the saliency metrics may comprise multi-valued metrics, and the one or more feature property measurements may include at least one of a Harris score, a pixel variance, a FAST score, a normalized cross-correlation (NCC) response in a neighborhood around the tracking region, a difference in NCC responses between inner and outer radii at a point location, a Harris score computed on NCC responses in a neighborhood around the tracking region, a number of frames, a length of time, a confidence level, a momentum, a curvature, a patch count, and a measure of photometric variance over time. The saliency metrics may be calculated from a mean or variance of one or more of the feature property measurements over a time interval.

In some embodiments, a trackability ranking order may be determined for tracked image features within a query video sequence using the trackability ranking algorithm, and a subset of the tracked image features within the query video sequence may be selected according to the trackability ranking order to facilitate at least one of an image-based recognition search, a video segmentation, or a pose estimation and mapping system. The subset of the tracked image features may be selected to satisfy at least one trackability ranking threshold, or at least one feature count requirement, wherein tracked image features are prioritized for selection according to the trackability ranking order. The image-based recognition search may be at least one of an image-based object recognition search and an image-based activity recognition search.

In some embodiments, a query tracking region may be established within the query video sequence that comprises an image patch in at least one frame of the query video sequence. The query tracking region may comprise a set of image patches that includes the image patch. The set of image patches may represent the image patch over a time interval. The tracked image features may be identified within the query video sequence according to an additional feature detection algorithm, which may be different from the feature detection algorithm used for establishing the tracking region within the training video sequence. The additional feature detection algorithm may comprise at least one a difference of Gaussian algorithm, Harris algorithm, FAST algorithm, edge detection algorithm, level curve curvature algorithm, Laplacian of Gaussian algorithm, determinant of Hessian algorithm and MSER algorithm.

Various objects, features, aspects and advantages of the inventive subject matter will become more apparent from the following detailed description of preferred embodiments, along with the accompanying drawing figures in which like numerals represent like components.

Figure 1A:
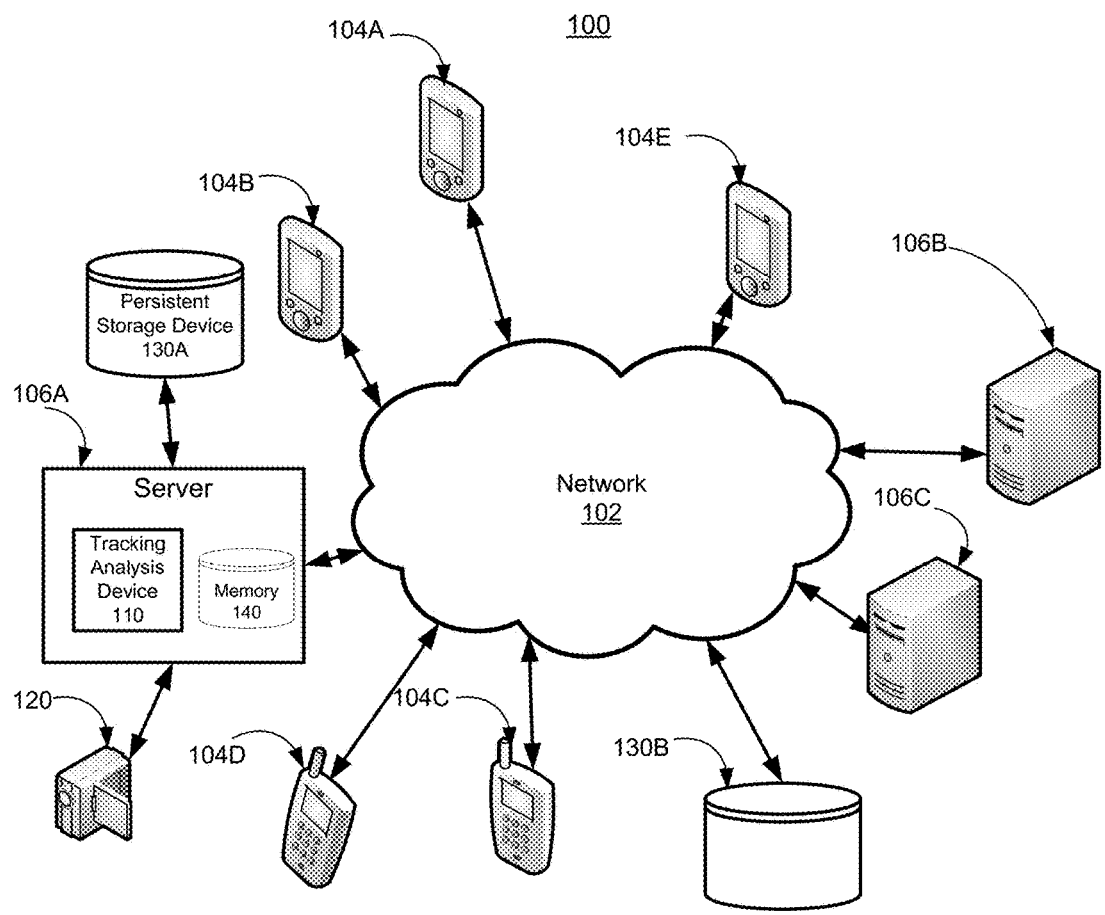
FIG. 1A illustrates an exemplary network environment that may be used for image feature trackability ranking systems and methods in accordance with various embodiments.

While the invention is described with reference to the above drawings, the drawings are intended to be illustrative, and other embodiments are consistent with the spirit, and within the scope, of the invention.

DETAILED DESCRIPTION

The various embodiments now will be described more fully hereinafter with reference to the accompanying drawings, which form a part hereof, and which show, by way of illustration, specific examples of practicing the embodiments. This description may, however, be embodied in many different forms and should not be construed as limited to the embodiments set forth herein; rather, these embodiments are provided so that this description will be thorough and complete, and will fully convey the scope of the invention to those skilled in the art. Among other things, this description may be embodied as methods or devices. Accordingly, any of the various embodiments herein may take the form of an entirely hardware embodiment, an entirely software embodiment or an embodiment combining software and hardware aspects. The following description is, therefore, not to be taken in a limiting sense.

Throughout the description and claims, the following terms take the meanings explicitly associated herein, unless the context clearly dictates otherwise:

The phrase "in one embodiment" as used herein does not necessarily refer to the same embodiment, though it may. Thus, as described below, various embodiments of the invention may be readily combined, without departing from the scope or spirit of the invention.

As used herein, the term "or" is an inclusive "or" operator, and is equivalent to the term "and/or," unless the context clearly dictates otherwise.

The term "based on" is not exclusive and allows for being based on additional factors not described, unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of a networked environment where two or more components or devices are able to exchange data, the terms "coupled to" and "coupled with" are also used to mean "communicatively coupled with", possibly via one or more intermediary devices.

In addition, throughout the description, the meaning of "a," "an," and "the" includes plural references, and the meaning of "in" includes "in" and "on."

The following discussion provides many example embodiments of the inventive subject matter. Although some of the various embodiments presented herein constitute a single combination of inventive elements, it should be appreciated that the inventive subject matter is considered to include all possible combinations of the disclosed elements. As such, if one embodiment comprises elements A, B, and C, and another embodiment comprises elements B and D, then the inventive subject matter is also considered to include other remaining combinations of A, B, C, or D, even if not explicitly discussed herein.

As used in the description herein and throughout the claims that follow, when a system, engine, server, device, module, or other computing element is described as being configured to perform or execute functions on data in a memory, the meaning of "configured to" or "programmed to" is defined as one or more processors or cores of the computing element being programmed by a set of software instructions stored in the memory of the computing element to execute the set of functions on target data or data objects stored in the memory.

It should be noted that any language directed to a computer should be read to include any suitable combination of computing devices, including servers, interfaces, systems, databases, agents, peers, engines, controllers, modules, or other types of computing device structures operating individually or collectively. One skilled in the art should appreciate the computing devices comprise a processor configured to execute software instructions stored on a tangible, non-transitory computer readable storage medium (e.g., hard drive, FPGA, PLA, solid state drive, RAM, flash, ROM, etc.). The software instructions configure or program the computing device to provide the roles, responsibilities, or other functionality as discussed below with respect to the disclosed apparatus. Further, the disclosed technologies can be embodied as a computer program product that includes a non-transitory computer readable medium storing the software instructions that causes a processor to execute the disclosed steps associated with implementations of computer-based algorithms, processes, methods, or other instructions. In some embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges among devices can be conducted over a packet-switched network, such as the Internet, a LAN, WAN, VPN, or other type of packet-switched network, a circuit-switched network, cell-switched network; or other type of network.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

The following description includes information that may be useful in understanding the present invention. It is not an admission that any of the information provided herein is prior art or relevant to the presently claimed invention, or that any publication specifically or implicitly referenced is prior art.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the description as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the description should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the description herein is deemed to contain the group as modified, thus fulfilling the written description of all Markush groups used in the appended claims.

One should appreciate that the disclosed techniques provide many advantageous technical effects including reducing computational overhead on a device recognizing an activity. Thus, a computing device is enabled to process digital imagery data by tracking a subset of image features selected using a trackability ranking algorithm. The computing device is able to process substantial amounts of digital data well beyond the capability of a human being.

The following disclosed techniques seek to determine which types of image features have greater trackability relative to other image features based on selected feature properties. It should be appreciated that the disclosed techniques treat image features in a generic sense as there is no requirement that training image features from which trackability ranking algorithms are generated be bound to specific objects. Thus, the disclosed training techniques could be performed once from training video sequences and then applied to query video sequences across many domain-specific applications.

The following techniques leverage a ranking support vector machine (SVM) algorithm adapted from an algorithm developed by Joachims Thorsen in 2003 (see Joachims, T. (2003), "Optimizing Search Engines using Clickthrough Data", Proceedings of the ACM Conference on Knowledge Discovery and Data Mining and URL en.wikipedia.org/wiki/Ranking_SVM). It should be appreciated that ranking SVM was developed specifically for ranking results of search engines rather than ranking image feature trackability. Thus, the various embodiments herein apply ranking SVM beyond its originally intended purpose.

Methods and systems for establishing a trackability ranking order from tracked image features within a training video sequence can be implemented and accessed in a variety of ways. FIG. 1A illustrates an exemplary network environment that may be used for image feature trackability ranking systems and methods in accordance with various embodiments. In one exemplary embodiment, a trackability ranking order or ranking strategy can be established and implemented within a networked computing environment 100 (e.g., a cloud-computing environment). Networked computing environment 100 comprises at least one network 102. In an exemplary embodiment, network 102 is the Internet. In other embodiments, network 102 may comprise one or more of a number of different types of networks, such as, for example, an intranet, a local area network (LAN), a wide area network (WAN), a wireless network, or other type of packet-switched network, circuit-switched network or cell-switched network. Other networks may be used. Alternatively, network 102 may comprise a combination of different types of networks.

Within the environment 100, one or more servers 106A-C can establish a trackability ranking order from tracked image features within a training video sequence. For example, server 106A may establish a tracking region within the training video sequence using a feature detection algorithm, compile trajectories of tracked image features within the tracking region using a feature tracking algorithm, assign saliency metrics to each one of the trajectories of tracked image features based on one or more feature property measurements within the tracking region, determine a trackability ranking algorithm that is a function of the saliency metrics and a defined feature trajectory ranking associated with the training video sequence, and provide the trackability ranking algorithm to one or more client devices 104A-E.

Client devices, such as one or more of client devices 104A-E, can access a trackability ranking order or ranking strategy established within environment 100 via network 102. Examples of client devices 104A-E can include cell phones, kiosks, personal data assistants, tablet computers, toys, vehicles, web cameras, or other types of computing devices. In an embodiment, a client device, e.g., client device 104A, may determine a trackability ranking order for tracked image features within a query video sequence using the trackability ranking algorithm, and select a subset of the tracked image features within the query video sequence according to the trackability ranking order to facilitate at least one of an image-based recognition search, a video segmentation, or a pose estimation and mapping system.

In a further embodiment, one or more servers (e.g., server 106A) can host or be in communication with apparatuses, e.g., tracking analysis device 110 and image capture device 120, persistent storage devices 130A-B, and main memory device 140, for establishing a trackability ranking order from tracked image features that is accessible by user devices 104A-E.

Figure 1B:
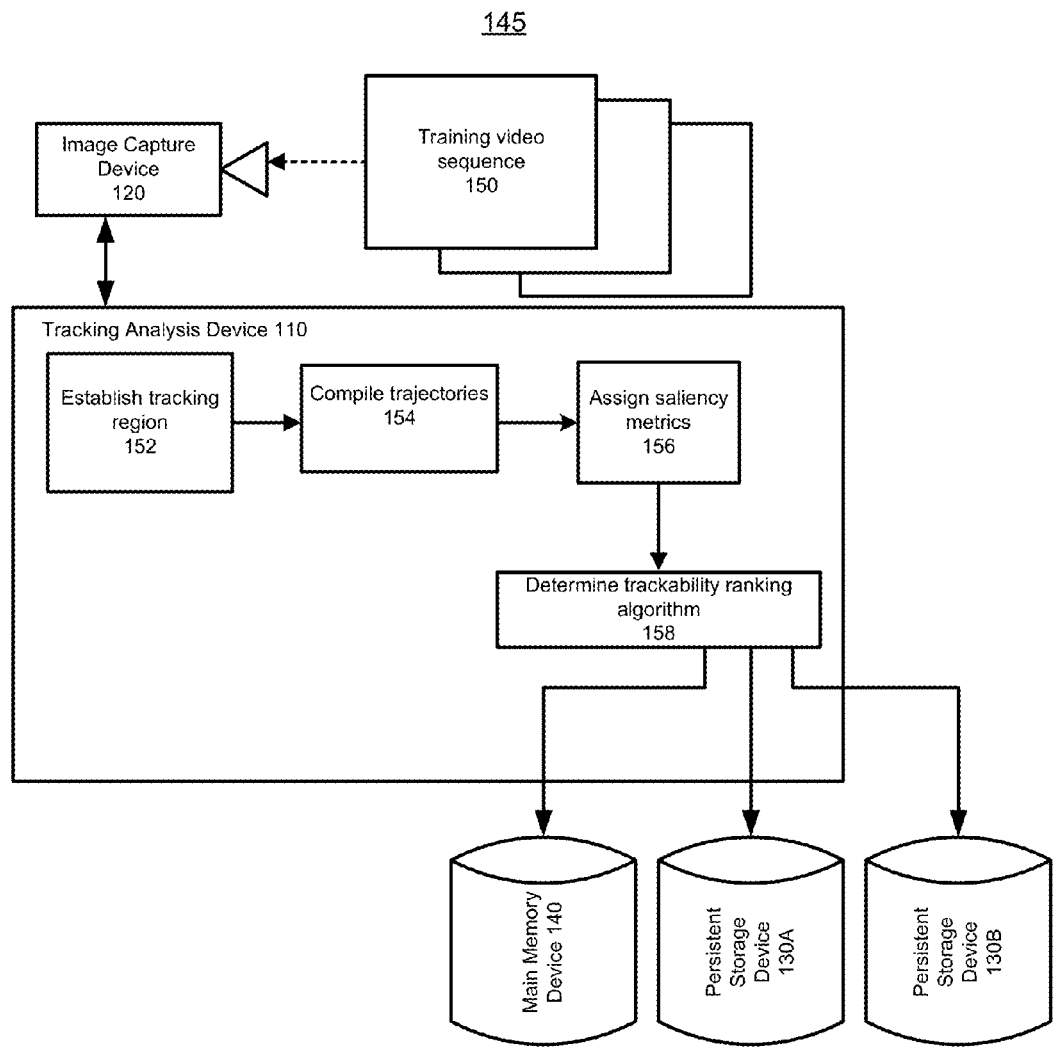
FIG. 1B illustrates apparatuses that may be used for establishing a trackability ranking order from tracked image features within a training video sequence in accordance with an embodiment.

FIG. 1B illustrates a block diagram of apparatuses for establishing a trackability ranking order from tracked image features within a training video sequence in accordance with an embodiment. In block diagram 145, elements for establishing a trackability ranking order include a tracking analysis device 110, image capture device 120, persistent storage devices 130A-B and main memory device 140. However, it should be noted that the elements in FIG. 1B, and the various functions attributed to each of the elements, while exemplary, are described as such solely for the purpose of ease of understanding. One skilled in the art will appreciate that one or more of the functions ascribed to the various elements may be performed by any one of the other elements, and/or by an element (not shown) configured to perform a combination of the various functions.

In an embodiment, tracking analysis device 110 is configured to establish a trackability ranking order from tracked image features within a training video sequence (e.g., obtained from image capture device 120) by establishing a tracking region 152 within a training video sequence using a feature detection algorithm. Training video sequence 150 may comprise at least one of stereoscopic, motion-capture, time-lapsed, 3D and computer-rendered video data. The tracking region may span across multiple frames of the training video sequence. In some embodiments, the multiple frames of the training video sequence may comprise at least two sequential frames.

Establishing the tracking region may include locating the tracking region based on at least one image feature identified using the feature detection algorithm. For example, the feature detection algorithm may comprise at least one of a features from accelerated segment test (FAST) algorithm, Harris corner algorithm, difference of Gaussian algorithm, level curve curvature algorithm, Laplacian of Gaussian algorithm, determinant of Hessian algorithm and maximally stable extremal regions (MSER) algorithm.

In some embodiments, the tracking region may comprise an image patch in at least one frame of the training video sequence, or a set of image patches that includes the image patch. For example, the set of image patches may represent the image patch over a time interval.

Further, the tracking region may comprise at least a 3D region of the training video sequence, wherein the 3D region includes a time dimension, or at least a 4D region of the training video sequence, wherein the 4D region includes a depth dimension.

Tracking analysis device 110 is further configured to compile trajectories 154 of tracked image features within the tracking region using a feature tracking algorithm. In some embodiments, a trajectory of a tracked image feature may include at least one of a number of frames, a length of time, an error, a confidence level, a momentum, a curvature, a patch count, a measure of photometric variance over time, and a line-of-sight measure. In some embodiments, the tracked image features may be identified according to an additional feature detection algorithm. The additional feature detection algorithm may be different from the feature detection algorithm used for establishing the tracking region within the training video sequence, and may comprise at least one a difference of Gaussian algorithm, Harris algorithm, FAST algorithm, edge detection algorithm, level curve curvature algorithm, Laplacian of Gaussian algorithm, determinant of Hessian algorithm and MSER algorithm.

Tracking analysis device 110 is further configured to assign saliency metrics 156 to each one of the trajectories of tracked image features based on one or more feature property measurements within the tracking region. In some embodiments, the saliency metrics may comprise multi-valued metrics, and the one or more feature property measurements may include at least one of a Harris score, a pixel variance, a FAST score, a normalized cross-correlation (NCC) response in a neighborhood around the tracking region, a difference in NCC responses between inner and outer radii at a point location, a Harris score computed on NCC responses in a neighborhood around the tracking region, a number of frames, a length of time, a confidence level, a momentum, a curvature, a patch count, and a measure of photometric variance over time. The saliency metrics may also have appended to them some subset of the trajectory properties mentioned previously. The saliency metrics may be calculated from a mean or variance of one or more of the feature property measurements over a time interval.

Tracking analysis device 110 is further configured to determine a trackability ranking algorithm 158 that is a function of the saliency metrics and a defined feature trajectory ranking associated with the training video sequence. In an embodiment, the defined feature trajectory ranking may be based on at least one of a track length, tracking error, tracking path, track depth of one or more training image features within the training video sequence, a number of frames, a length of time, an error, a confidence level, a momentum, a curvature, a patch count, a measure of photometric variance over time, and a line-of-sight measure. In some embodiments, the trackability ranking algorithm comprises a linear ranking function, and the ordering of tracked image features may comprise sorting trajectories by a result of a linear combination of the saliency metrics. The linear ranking function may be learned using a ranking support vector machine (SVM). In some embodiments, the linear ranking function may operate on a vector of saliency metrics expanded via a kernel map. Further, the trackability ranking algorithm may comprise a multi-dimensional ranking function. The multi-dimensional ranking function may be learned using a ranking support vector machine (SVM).

The trackability ranking algorithm may be stored (e.g., within a persistent storage device 130A-B and/or main memory device 140) for ranking, based on trackability, tracked image features within another video sequence, such as a query video sequence. For example, the stored trackability ranking algorithm may be used to facilitate at least one of an image-based recognition search, a video segmentation, or a pose estimation and mapping system at one or more of client devices 104A-E via network 102.

Figure 1C:
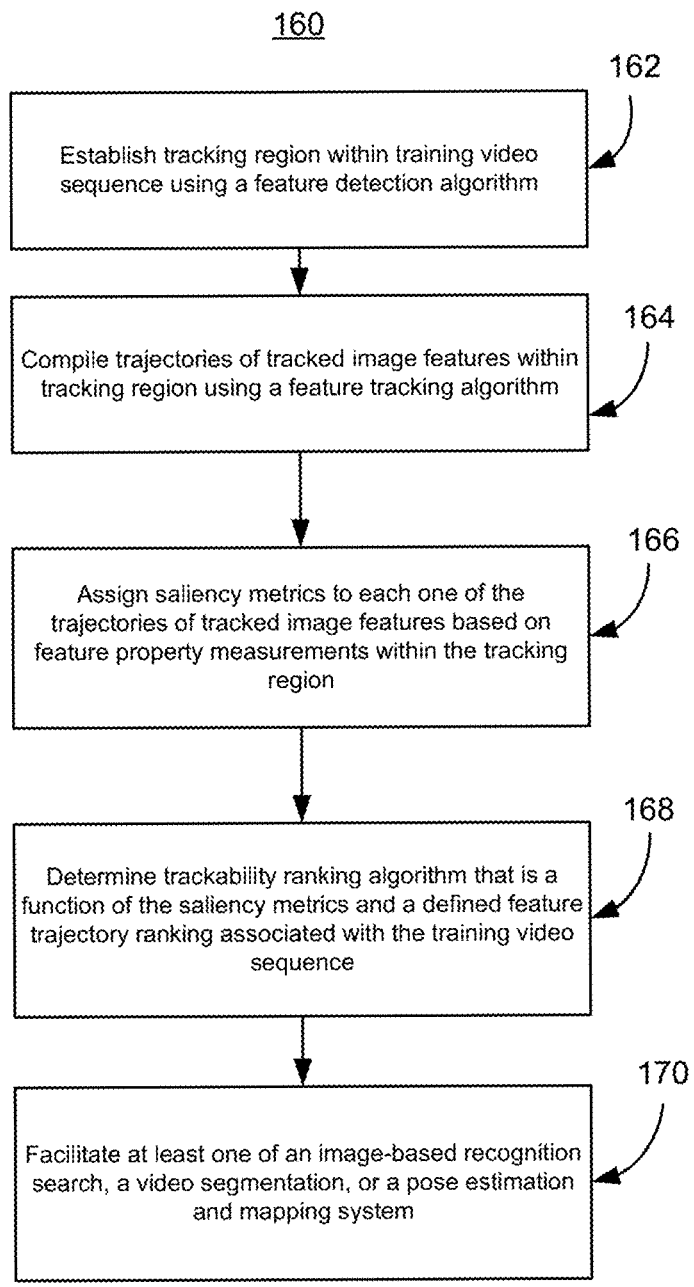
FIG. 1C illustrates a flow diagram of example operations for establishing a trackability ranking order for tracked image features within a training video sequence in accordance with an embodiment.
Figure 2:
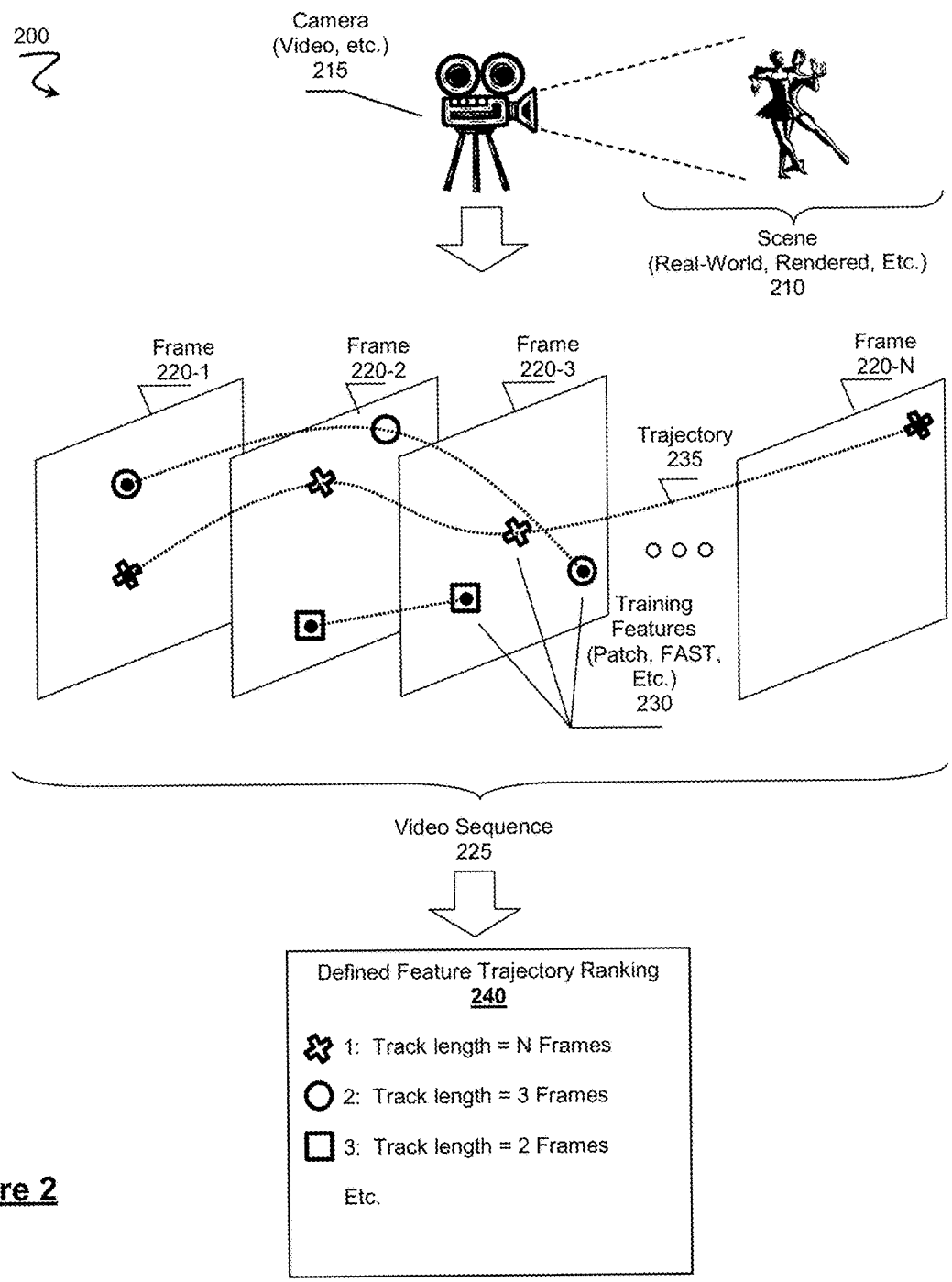
FIG. 2 illustrates capturing a training video sequence in accordance with an embodiment.
Figure 3:
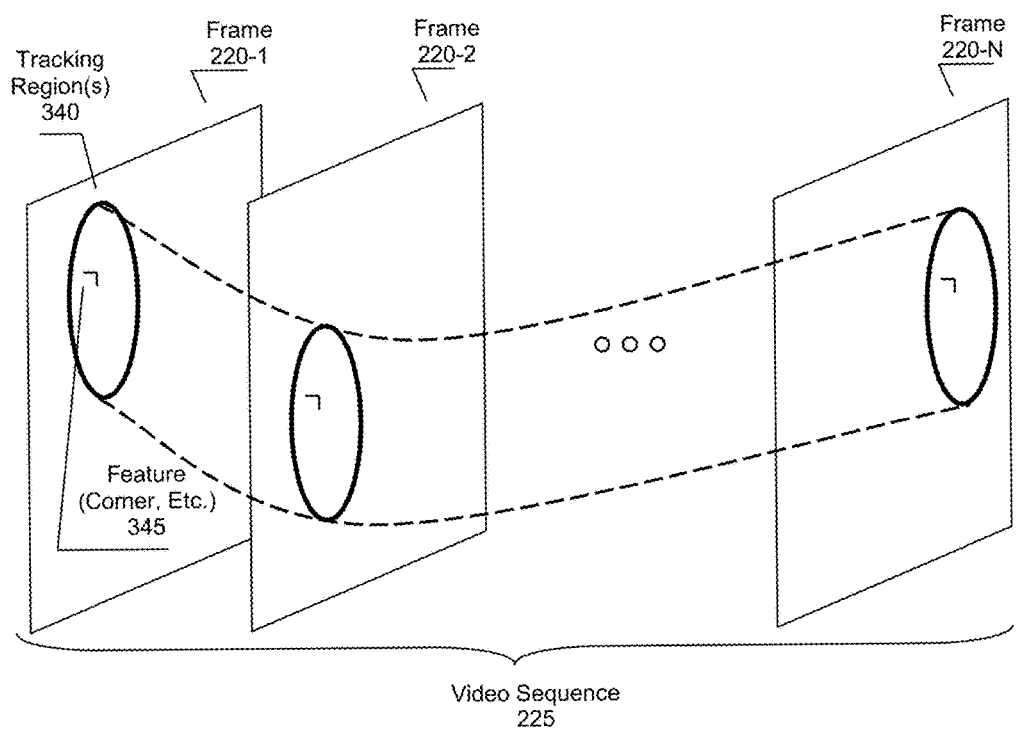
FIG. 3 illustrates a tracked region of a training video sequence in accordance with an embodiment.
Figure 4:
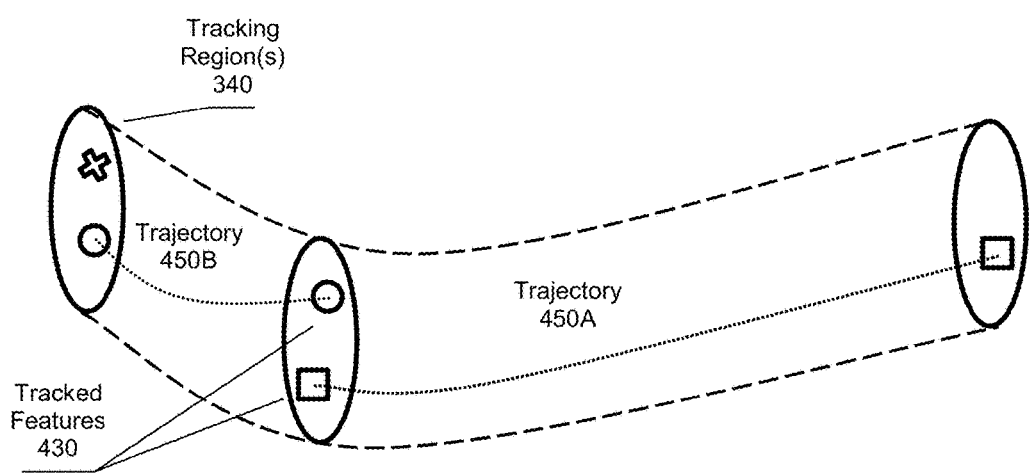
FIG. 4 illustrates tracked feature trajectories within a training video sequence in accordance with an embodiment.

FIG. 1C illustrates a flow diagram of example operations for establishing a trackability ranking order for tracked image features within a training video sequence in accordance with an embodiment. FIG. 1C presents an overview of method 160 of establishing tracking feature ranking strategies executed by a tracking analysis device (e.g., computer server, computer client, tablet, gaming console, etc.), such as tracking analysis device 110 in FIG. 1B. FIGS. 2-4 below present additional details regarding the various steps of method 160, and are referenced seriatim with corresponding steps of method 160.

In the various embodiments, tracking analysis device 110 may obtain at least one training video sequence having a defined feature trajectory ranking associated with a set of training features in the training video sequence. Tracking analysis device 110 can obtain the training video sequence through various techniques. For example, tracking analysis device 110 may be configured to obtain the training video sequence from image capture device 120. In some embodiments, tracking analysis device 110 may comprise one or more optical sensors (e.g., camera sensors) configured to directly capture the training video sequence. In other embodiments, tracking analysis device 110 may be configured to download or upload the training video sequence, such as via network 102. For example, tracking analysis device 110 could obtain the training video sequence from one or more remote (e.g., internet-based) video services such as, for example, YouTube®, Vimeo®, etc.

FIG. 2 illustrates capturing a training video sequence in accordance with an embodiment. In method 200, camera 215 (which may correspond to tracking analysis device 110 and/or image capture device 120) captures training video sequence 225 of scene 210. Although scene 210 is depicted as dancers in a real-world setting, it should be appreciated that the scene could include any subject matter. For example, the scene could be rendered via a gaming system. Training video sequence 225 can be considered a sequence of images that change with time. As such, training video sequence 225 is represented as individual frames 220-1 through 220-N, collectively referred to as frames 220. Frames 220 can include individual images as well as interpolated images according to one or more video encoding formats (e.g. MPEG4, etc.).

Training video sequence 225 can represent various forms of video data, possibly including stereoscopic video, motion capture video as referenced above, time-lapsed video, 3D video, 4D video (e.g., 3D content that changes with time), or other types of video data. It should be appreciated that training video sequence 225 could also represent different domains including games, sports, medical imaging or video, surveillance, television programming, web programming, dynamic big-data visualizations, or other domains.

Training video sequence 225 comprises a digital representation of scene 210 where frames 220 include one or more observable training features 230. Training features 230 represent known or previously understood features considered present within one or more of frames 220. For example, the circle feature 230 could represent a gradient-based feature present in Frames 220-1, 220-2 and 220-3, but not present in frame 220-N. Training video sequence 225 includes one or more defined feature trajectories 235. Each of the trajectories can be characterized by a set of tuples that include one or more of a feature identifier (e.g., descriptor, GUID, etc.), pixel coordinate (e.g., X, Y, possibly Z, etc.), frame number, time stamp, or other feature tracking information.

In an embodiment, training video sequence 225 is associated with a defined feature tracking ranking 240. Defined feature tracking ranking 240 represents a "ground truth" of how well each feature tracked through the video sequence 225. Defined feature tracking ranking 240 can be established through various techniques. In some embodiments, video sequence 225 can be instantiated or otherwise constructed with desired tracking properties. For example, video sequence 225 may be a video game graphic animation having defined feature properties. In other embodiments, video sequence 225 may be captured based on motion capture techniques where features and their tracking properties are well understood. In an optional embodiment, training video sequence 225 could be analyzed with respect to one or more feature detection algorithms to identify the features and trajectories of the features could be ranked according to an automatic criteria such as track length. Then, mechanical turk workers could rank the trajectories of the features, thereby validating the defined feature trajectory ranking 240.

In the example shown, defined feature trajectory ranking 240 ranks trajectories 235 by track length as measured in the number of frames where the feature is present. With respect to a traditional Ranking SVM use case for search results, track length would correspond to a search query while defined feature trajectory ranking 240 would correspond to the ranking method applied to the trajectories associated with the "query" of track length. It should be appreciated that the ranking of the trajectories can be according to other metrics beyond number of frames. For example, other ranking metrics may include track errors, feature repeatability, tracking confidence scores, track path, a track depth, time or duration of tracks, photometric variance of a patch over the lifetime of the trajectory, or other factors. Although a Ranking SVM embodiment may leverage a single query (e.g., track length), other Ranking SVM embodiments may leverage additional queries (e.g., errors, depth, etc.).

It should be appreciated that training video sequence 225 represents the ground truth for tracking information by which the disclosed techniques determine trackability ranking algorithm as discussed below. The following steps also apply to training video sequence 225.

At step 162, a tracking region is established within the training video sequence using a feature detection algorithm. FIG. 3 illustrates a tracked region of a training video sequence in accordance with an embodiment. For example, in FIG. 3 a tracking region 340 is established across frames 220 of video sequence 225. One or more of tracking region 340 can be established by identifying a patch in a frame around an identified feature. Tracking region 340 is established by projecting the patch through subsequent frames in training video sequence 220. Tracking region 340 comprises a start position (e.g., frame number, time stamp, etc.), an end position, a size, a shape, a depth, or other region properties.

In an embodiment, tracking region 340 may comprise a static shape (e.g., circle, ellipse, bound box, etc.) that does not change in size or shape from frame to frame. In other embodiments, tracking region could change size or shape to account for changing properties of video sequence 225 from frame-to-frame. For example, tracking region 340 could be a circle within frame 220-1, but change to a reduced size ellipse in frame 220-2 to account for, e.g., a change in scale of the image data, a change in depth information, or a change in image capturing device orientation relative to the scene.

In some embodiments, tracking regions are located based on a feature identified using a feature detection algorithm, as in step 164. In the example shown, tracking region 340 is located based on a detected corner. For example, tracking region 340 could comprise a patch that is identified in frame 220-1 using a FAST algorithm. The feature detection algorithm could include one or more of a FAST algorithm, a Harris corner algorithm, a difference of Gaussian algorithm, or other known feature detection algorithms.

Tracking region 340 can span across multiple frames of video sequence 220. Typically, tracking region 340 will span across at least two sequential frames, e.g., frames 220-1 to 220-2. However, it is also possible that tracking region 340 could comprise interruptions. For example, a foreground object could temporarily occlude features within tracking region 340. Thus, tracking region 340 could comprise discontinuous sets of frame sequences. Thus, tracking region 340 can comprise one or more image patches or sets of image patches projected through time.

In view that tracking region 340 can comprise image patches through time, it could be considered a multi-dimensional data construct. For example, tracking region 340 can be a 3D region subtending video sequence 220, wherein region 340 includes a time dimension (e.g., time stamps, duration, frames, etc.). Further, tracking region 340 could be a 4D region having time and depth dimensional components beyond height and width properties. When multiple tracking regions 340 are present, the regions 340 can overlap each other or be restricted from overlapping, if desired.

At step 164, trajectories of tracked image features are compiled within the tracking region using a feature tracking algorithm. At this point, the patches associated with regions 340 are analyzed to identify tracked features, which could be identified according to at least one additional feature detection algorithm. The tracked features could include a heterogeneous mix of features (e.g., Difference of Gaussian, Harris, FAST, Edges, Level curve curvature, Laplacian of Gaussian, Determinant of Hessian, MSER, or other features). The one or more feature detection algorithms used to identify the tracked features are not required to be the same as the feature detection algorithm used to construct tracking region 340. However, the tracked features may correspond with the training features referenced above.

FIG. 4 illustrates tracked feature trajectories within a training video sequence in accordance with an embodiment. In FIG. 4, tracked features 430 generally correspond to training features 230 discussed previously. However, tracked features 430 are identified and tracked as they would be in field use. Thus, tracked features 430 could be a subset of training features 230, a super-set of training features 230, an overlapping set relative to training features 230, or other type of set.

Tracking analysis device 110 compiles a set of trajectories comprising one or more tracked feature trajectories as represented by trajectories 450A and 450B, collectively referred to as trajectories 450. Each of trajectories 450 can include information relating to how a feature is tracked from frame to frame. For example, trajectories 450 can include a start frame, an end frame, a pixel coordinate, depth, number of frames, discontinuity in frame sequences, an error, a momentum, a path curvature, a patch count, a line of sight measure, or other track-related information. For example, the trajectory associated with the cross feature might be a NULL set because the feature is not present in more than one frame. Trajectory 450B may include feature information for only two frames while trajectory 450A may include track information spanning many frames. It should be appreciated that trajectories 450 have similar characteristics to the trajectories 235 associated with the training features in video sequence 225.

At step 166, saliency metrics are assigned to each one of the trajectories of tracked image features based on feature property measurements within the tracking region. With respect to an embodiment employing Ranking SVM, the set of saliency metrics represent the mapping function $\Phi(q, d)$ where q represents track length or other trajectory property and d represents the ranking of trajectories 450, which could include ranking by track length.

The saliency metrics are derived according to one or more saliency measures relating to the corresponding tracked features 450. The saliency measures represent functions applied to tracked features 450 or their surrounding environments in tracked regions 340. Example saliency measures include a Harris score, a pixel variance, a FAST score, a normalized cross-correlation (NCC) response in a neighborhood around a feature, a difference in NCC scores between concentric radii in a neighborhood around the feature, gradients, or other properties of the feature. It should be appreciated that the set of saliency metrics could grow over time as new feature properties are added. If new properties are added, then step 166 can be repeated to create new vector information. The saliency metrics can be single valued or multi-valued. For example, a multi-valued saliency measure can include an edge curvature as well as an error or confidence level of the curvature. In such case, each value of the saliency metric can be incorporated into the vector.

At step 168, a trackability ranking algorithm that is a function of the saliency metrics and a defined feature trajectory ranking associated with the training video sequence is determined, the trackability ranking algorithm being usable for ranking, based on trackability, tracked image features within another video sequence. The trackability ranking algorithm (i.e., ranking strategy) determines how tracked features 430 should be ranked. With respect to an embodiment that employs Ranking SVM, the trackability ranking algorithm is a retrieval function of weights. The trackability ranking algorithm may comprise a linear ranking function (e.g., a model learned for a single query type in Ranking SVM, etc.), which comprises a linear combination of saliency metrics. Further, the trackability ranking algorithm could comprise a multi-dimensional ranking function (e.g., a model learned from different query types in Ranking SVM, etc.). Even further, to achieve nonlinear level of performance in learning the trackability ranking algorithm while maintaining the speed and scalability of a linear Ranking SVM framework, a kernel map (such as described in A. Vedaldi and A. Zisserman, "Efficient Additive Kernels via Explicit Feature Maps", in Pattern Analysis and Machine Intelligence (PAMI), 34(3), 2012), may be applied to the set of saliency metrics defined by the mapping function $\varphi(q, d)$.

At step 170, at least one of an image-based recognition search, a video segmentation, or a pose estimation and mapping system is facilitated using the trackability ranking algorithm. For example, tracking analysis device 110 may store the trackability ranking algorithm as a ranking strategy on a computer readable medium. The ranking strategy can then be deployed in a tracking client device 104 (e.g., a cell phone, tablet, surveillance camera, toy, vehicle, etc.), which leverages the trackability ranking algorithm to determine which features should be tracked according to the trackability ranking. Therefore, the trackability ranking algorithm can be considered as a data structure having weights associated with saliency metrics. In field use, the tracking device can identify a set of features in an image, and then calculate saliency scores of each feature. The trackability ranking can then be calculated by taking a dot product of the feature's saliency scores and the weight vector. In the case of nonlinear approximation via kernel maps, the vector of saliency scores can be expanded using a kernel map to match the dimension of the learned weight vector, before the dot product calculation. The result of the trackability ranking algorithm is a scalar rank for each feature where the larger the rank value indicates a feature having greater trackability. It should be noted that the tracked features used to establish the trackability ranking algorithm do not have to correspond to observed features in the field. Rather, the trackability ranking algorithm is determined based on the properties of the tracked features or based on ingested known object images. In field use, the feature ranking is based on observed features having similar properties as the training sample.

With respect to object recognition and tracking, the tracking device can be provisioned with one or more key frames comprising image information of a known object from specific points-of-view (PoV). Each key frame can be divided into a grid of cells, e.g., a five-by-five grid. Each cell can include a sorted list of features expected to be present in the cell where the list of features have been ranked by the ranking strategy. This approach is considered advantageous for several reasons. First, the tracking device can calculate object identification features directly from the key frame rather than retrieving the features or their descriptors from a remote host, especially when the key frame has a smaller data size than the corresponding features or descriptors. Second, the cells of the grid can be annotated with feature trackability information, which reduces computation time and ensures only trackable features are monitored. Such a technique may provide for processing video data at typical frame rates during field use.

Figure 5:
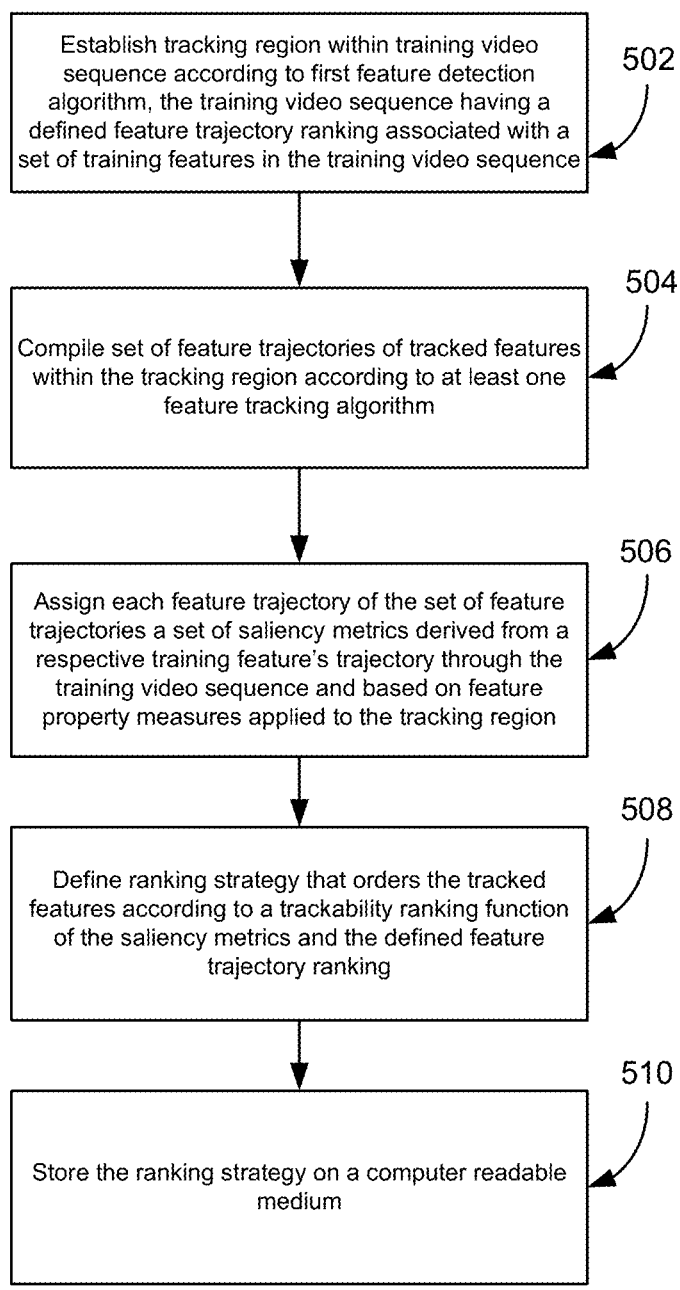
FIG. 5 illustrates a flow diagram of example operations for establishing a trackability ranking order for tracked image features in accordance with an embodiment.

FIG. 5 illustrates a flow diagram of example operations of establishing a trackability ranking order for tracked image features in accordance with an embodiment. FIG. 5 presents an alternate way of conceptualizing the definition of a ranking strategy that would employ the trackability ranking algorithm described above. It should be appreciated that method 500 is executed by one or more computing devices configured to or programmed to have the disclosed roles or responsibilities of a tracking analysis device, such as tracking analysis device 110. For example, the tracking analysis device may comprise a server or client device, including a cell phone, kiosk, personal data assistant, tablet computer, toy, vehicle, web camera, or other type of computer device. Further, the tracking analysis device may include a camera, e.g., camera 215, which may comprise an image capture device (e.g., a video camera or a gaming console) equipped to capture image frames of video data.

At step 502, a tracking region is established within a training video sequence according to first feature detection algorithm, the training video sequence having a defined feature trajectory ranking associated with a set of training features in the training video sequence.

At step 504, a set of feature trajectories of tracked features within the tracking region is compiled according to at least one feature tracking algorithm.

At step 506, each feature trajectory of the set of feature trajectories is assigned a set of saliency metrics derived from a respective training feature's trajectory through the training video sequence and based on feature property measures applied to the tracking region.

At step 508, a ranking strategy is defined that orders the tracked features according to a trackability ranking function of the saliency metrics and the defined feature trajectory ranking.

At step 510, the ranking strategy is stored on a computer readable medium, e.g., to facilitate at least one of an image-based recognition search, a video segmentation, or a pose estimation and mapping system.

As described above in FIG. 1A, systems, apparatus, and methods described herein may be implemented using computers operating in a client-server relationship. Typically, in such a system, the client computers are located remotely from the server computers and interact via a network. The client-server relationship may be defined and controlled by computer programs running on the respective client and server computers.

Figure 6A:
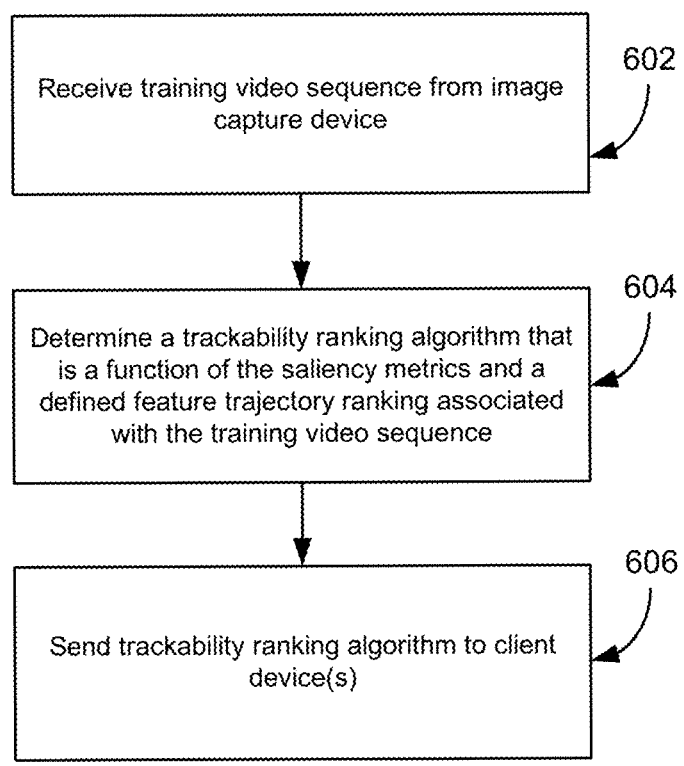
FIG. 6A illustrates a flow diagram of exemplary server operations that can be used for implementing one or more aspects of the various embodiments.
Figure 6B:
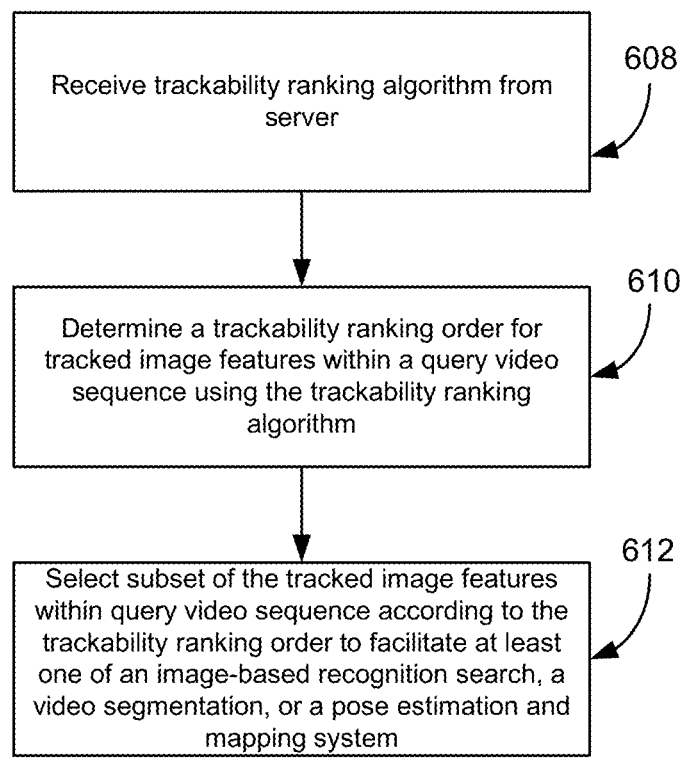
FIG. 6B illustrates a flow diagram of exemplary client operations that can be used for implementing one or more aspects of the various embodiments.

High-level flow diagrams of exemplary client-server operations that may be used to implement systems, apparatus and methods described herein are illustrated in FIGS. 6A and 6B. For example, the client-server relationship may comprise one or more servers, e.g., one or more of servers 106A-C, and one or more client devices, e.g., one or more of client devices 104A-E, in communication with via network 102, as illustrated in FIG. 1A. Method 600, comprising method 600A and 600B, illustrates one possible division of feature trackability ranking tasks between client devices 104 and servers 106.

FIG. 6A illustrates a flow diagram of exemplary server operations 600A that can be used for implementing one or more aspects of the various embodiments. At step 602, one or more of servers 106 (see FIG. 1A) are configured to receive a training video sequence from an image capture device (e.g., image capture device 120). At step 604, the one or more of servers 106 are further configured to determine a trackability ranking algorithm that is a function of the saliency metrics and a defined feature trajectory ranking associated with the training video sequence. For example, the one or more servers 106 may be configured to establish a tracking region within a training video sequence using a feature detection algorithm, compile trajectories of tracked image features within the tracking region using a feature tracking algorithm, assign saliency metrics to each one of the trajectories of tracked image features based on one or more feature property measurements within the tracking region, and determine a trackability ranking algorithm that is a function of the saliency metrics and a defined feature trajectory ranking associated with the training video sequence, the trackability ranking algorithm being usable for ranking, based on trackability, tracked image features within another video sequence. At step 606, the one or more of servers 106 are further configured to send the trackability ranking algorithm to one or more client devices 104.

FIG. 6B illustrates a flow diagram of exemplary client operations 600B that can be used for implementing one or more aspects of the various embodiments. For example, one or more client devices 104, e.g., cell phones, kiosks, personal data assistants, tablet computers, toys, vehicles, web cameras, or other types of computing devices (see FIG. 1A), in accordance with the various embodiments described above, are configured at step 608 to receive the trackability ranking algorithm from server(s) 106. At step 610, the one or more client devices 104 are further configured to determine a trackability ranking order for tracked image features within a query video sequence using the trackability ranking algorithm. At step 612, the one or more client devices 104 are further configured to select a subset of the tracked image features within the query video sequence according to the trackability ranking order to facilitate at least one of an image-based recognition search, a video segmentation, or a pose estimation and mapping system.

One skilled in the art will appreciate that the exemplary client-server relationship illustrated in FIGS. 6A and 6B is only one of many client-server relationships that are possible for implementing the systems, apparatus, and methods described herein. As such, the client-server relationship illustrated in FIGS. 6A and 6B should not, in any way, be construed as limiting.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIGS. 1C, 5, 6A and 6B may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 7:
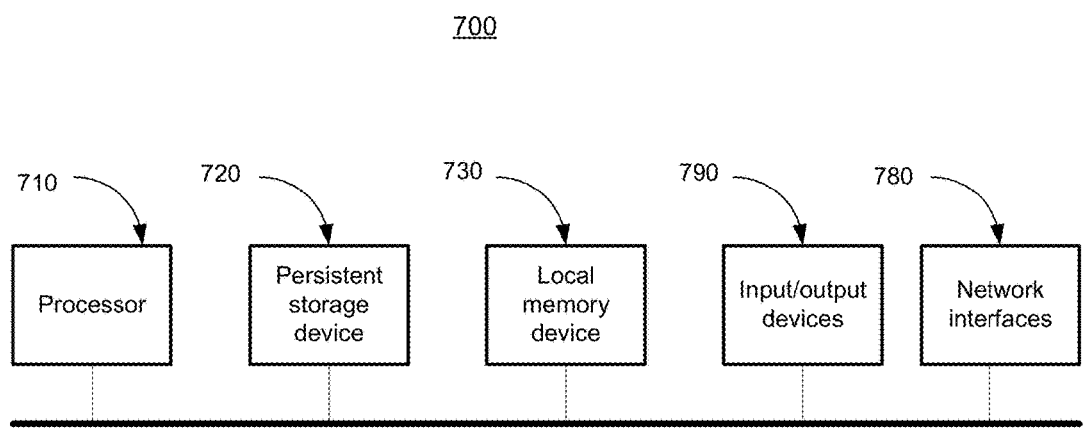
FIG. 7 illustrates a block diagram of a distributed computer system that can be used for implementing one or more aspects of the various embodiments.

A high-level block diagram of an exemplary apparatus that may be used to implement systems, apparatus and methods described herein is illustrated in FIG. 7. Apparatus 700 comprises a processor 710 operatively coupled to a persistent storage device 720 and a main memory device 730. Processor 710 controls the overall operation of apparatus 700 by executing computer program instructions that define such operations. The computer program instructions may be stored in persistent storage device 720, or other computer-readable medium, and loaded into main memory device 730 when execution of the computer program instructions is desired. For example, tracking analysis device 110 and image capture device 120 may comprise one or more components of apparatus 700. Thus, the method steps of FIGS. 1C, 5, 6A and 6B can be defined by the computer program instructions stored in main memory device 730 and/or persistent storage device 720 and controlled by processor 710 executing the computer program instructions. For example, the computer program instructions can be implemented as computer executable code programmed by one skilled in the art to perform an algorithm defined by the method steps of FIGS. 1C, 5, 6A and 6B. Accordingly, by executing the computer program instructions, the processor 710 executes an algorithm defined by the method steps of FIGS. 1C, 5, 6A and 6B. Apparatus 700 also includes one or more network interfaces 780 for communicating with other devices via a network. Apparatus 700 may also include one or more input/output devices 790 that enable user interaction with apparatus 700 (e.g., display, keyboard, mouse, speakers, buttons, etc.).

Processor 710 may include both general and special purpose microprocessors, and may be the sole processor or one of multiple processors of apparatus 700. Processor 710 may comprise one or more central processing units (CPUs), for example. Processor 710, persistent storage device 720, and/or main memory device 730 may include, be supplemented by, or incorporated in, one or more application-specific integrated circuits (ASICs) and/or one or more field programmable gate arrays (FPGAs).

Persistent storage device 720 and main memory device 730 each comprise a tangible non-transitory computer readable storage medium. Persistent storage device 720, and main memory device 730, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 790 may include peripherals, such as a printer, scanner, display screen, etc. For example, input/output devices 790 may include a display device such as a cathode ray tube (CRT), plasma or liquid crystal display (LCD) monitor for displaying information (e.g., a plurality of image transformations for selection) to a user, a keyboard, and a pointing device such as a mouse or a trackball by which the user can provide input to apparatus 700.

Any or all of the systems and apparatus discussed herein, including tracking analysis device 110 and image capture device 120 may be performed by, and/or incorporated in, an apparatus such as apparatus 700.

One skilled in the art will recognize that an implementation of an actual computer or computer system may have other structures and may contain other components as well, and that FIG. 7 is a high level representation of some of the components of such a computer for illustrative purposes.

The foregoing specification is to be understood as being in every respect illustrative and exemplary, but not restrictive, and the scope of the invention disclosed herein is not to be determined from the specification, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A method of establishing a trackability ranking order from tracked image features within a training video sequence at a tracking analysis device, the method comprising:
   establishing a tracking region within the training video sequence using a feature detection algorithm;
   compiling trajectories of tracked image features within the tracking region using a feature tracking algorithm;
   assigning saliency metrics to each one of the trajectories of the tracked image features based on one or more feature property measurements within the tracking region;
   determining a trackability ranking order for the tracked image features within the training video sequence using a trackability ranking algorithm that is a function of the saliency metrics and a defined feature trajectory ranking associated with the training video sequence, wherein the trackability ranking algorithm comprises at least sorting the trajectories of the tracked image features by a result of a linear combination of the saliency metrics; and
   selecting a subset of the tracked image features within a query video sequence according to the trackability ranking order to facilitate at least one of an image-based recognition search, a video segmentation, or a pose estimation and mapping system.

2. The method of claim 1, wherein establishing the tracking region includes locating the tracking region based on at least one image feature identified using the feature detection algorithm.

3. The method of claim 2, wherein the feature detection algorithm comprises at least one of a features from accelerated segment test (FAST) algorithm, Harris corner algorithm, difference of Gaussian algorithm, level curve curvature algorithm, Laplacian of Gaussian algorithm, determinant of Hessian algorithm and maximally stable extremal regions (MSER) algorithm.

4. The method of claim 1, wherein the tracking region spans across multiple frames of the training video sequence.

5. The method of claim 4, wherein the multiple frames of the training video sequence comprise at least two sequential frames.

6. The method of claim 1, wherein the tracking region comprises an image patch in at least one frame of the training video sequence.

7. The method of claim 6, wherein the tracking region comprises a set of image patches that includes the image patch.

8. The method of claim 7, wherein the set of image patches represent the image patch over a time interval.

9. The method of claim 1, wherein the tracking region comprises at least a 3D region of the training video sequence, wherein the 3D region includes a time dimension.

10. The method of claim 9, wherein the tracking region comprises at least a 4D region of the training video sequence, wherein the 4D region includes a depth dimension.

11. The method of claim 1, further comprising identifying the tracked image features according to an additional feature detection algorithm.

12. The method of claim 11, wherein the additional feature detection algorithm is different from the feature detection algorithm used for establishing the tracking region within the training video sequence.

13. The method of claim 11, wherein the additional feature detection algorithm comprises at least one a difference of Gaussian algorithm, Harris algorithm, FAST algorithm, edge detection algorithm, level curve curvature algorithm, Laplacian of Gaussian algorithm, determinant of Hessian algorithm and MSER algorithm.

14. The method of claim 1, wherein the defined feature trajectory ranking is based on at least one of a track length, tracking error, tracking path, track depth of one or more training image features within the training video sequence, a number of frames, a length of time, an error, a confidence level, a momentum, a curvature, a patch count, a measure of photometric variance over time, and a line-of-sight measure.

15. The method of claim 1, wherein the trackability ranking algorithm comprises a linear ranking function.

16. The method of claim 15, wherein the ordering of tracked image features comprises sorting trajectories by a result of a linear combination of the saliency metrics.

17. The method of claim 15, wherein the linear ranking function is learned using a ranking support vector machine (SVM).

18. The method of claim 15, wherein the linear ranking function operates on a vector of saliency metrics expanded via a kernel map.

19. The method of claim 1, wherein the trackability ranking algorithm comprises a multi-dimensional ranking function.

20. The method of claim 19, wherein the multi-dimensional ranking function is learned using a ranking support vector machine (SVM).

21. The method of claim 1, wherein the training video sequence comprises at least one of stereoscopic, motion-capture, time-lapsed, 3D and computer-rendered video data.

22. The method of claim 1, wherein a trajectory of a tracked image feature includes at least one of a number of frames, a length of time, an error, a confidence level, a momentum, a curvature, a patch count, a measure of photometric variance over time, and a line-of-sight measure.

23. The method of claim 1, wherein the saliency metrics comprise multi-valued metrics.

24. The method of claim 1, wherein the one or more feature property measurements include at least one of a Harris score, a pixel variance, a FAST score, a normalized cross-correlation (NCC) response in a neighborhood around the tracking region, a difference in NCC responses between inner and outer radii at a point location, a Harris score computed on NCC responses in a neighborhood around the tracking region, a number of frames, a length of time, a confidence level, a momentum, a curvature, a patch count, and a measure of photometric variance over time.

25. The method of claim 24, wherein the saliency metrics are calculated from a mean or variance of one or more of the feature property measurements over a time interval.

26. The method of claim 1, further comprising:
determining a trackability ranking order for tracked image features within a query video sequence using the trackability ranking algorithm; and
selecting a subset of the tracked image features within the query video sequence according to the trackability ranking order to facilitate at least one of an image-based recognition search, a video segmentation, or a pose estimation and mapping system.

27. The method of claim 26, wherein the subset of the tracked image features is selected to satisfy at least one trackability ranking threshold.

28. The method of claim 26, wherein the subset of the tracked image features is selected to satisfy at least one feature count requirement, wherein tracked image features are prioritized for selection according to the trackability ranking order.

29. The method of claim 26, wherein the image-based recognition search is at least one of an image-based object recognition search and an image-based activity recognition search.

30. The method of claim 26, further comprising establishing a query tracking region within the query video sequence that comprises an image patch in at least one frame of the query video sequence.

31. The method of claim 30, wherein the query tracking region comprises a set of image patches that includes the image patch.

32. The method of claim 31, wherein the set of image patches represent the image patch over a time interval.

33. The method of claim 26, further comprising identifying the tracked image features within the query video sequence according to an additional feature detection algorithm.

34. The method of claim 33, wherein the additional feature detection algorithm is different from the feature detection algorithm used for establishing the tracking region within the training video sequence.

35. The method of claim 33, wherein the additional feature detection algorithm comprises at least one a difference of Gaussian algorithm, Harris algorithm, FAST algorithm, edge detection algorithm, level curve curvature algorithm, Laplacian of Gaussian algorithm, determinant of Hessian algorithm and MSER algorithm.

36. A system for establishing a trackability ranking order from tracked image features within a training video sequence, the system comprising:
a database configured to store a defined feature trajectory ranking associated with the training video sequence; and
a tracking analysis device coupled with the database and configured to:
establish a tracking region within the training video sequence using a feature detection algorithm;
compile trajectories of tracked image features within the tracking region using a feature tracking algorithm;
assign saliency metrics to each one of the trajectories of the tracked image features based on one or more feature property measurements within the tracking region;
determine a trackability ranking order for the tracked image features within the training video sequence using a trackability ranking algorithm that is a function of the saliency metrics and a defined feature trajectory ranking associated with the training video sequence, wherein the trackability ranking algorithm comprises at least sorting the trajectories of the tracked image features by a result of a linear combination of the saliency metrics; and
select a subset of the tracked image features within a query video sequence according to the trackability ranking order to facilitate at least one of an image-based recognition search, a video segmentation, or a pose estimation and mapping system.

37. A computer program product embedded in a non-transitory computer readable medium comprising instructions executable by a computer processor for establishing a trackability ranking order from tracked image features within a training video sequence, the instructions being executable by a computer processor to execute processing comprising:
- establishing a tracking region within the training video sequence using a feature detection algorithm;
- compiling trajectories of tracked image features within the tracking region using a feature tracking algorithm;
- assigning saliency metrics to each one of the trajectories of the tracked image features based on one or more feature property measurements within the tracking region;
- determining a trackability ranking order for the tracked image features within the training video sequence using a trackability ranking algorithm that is a function of the saliency metrics and a defined feature trajectory ranking associated with the training video sequence, wherein the trackability ranking algorithm comprises at least sorting the trajectories of the tracked image features by a result of a linear combination of the saliency metrics; and
- selecting a subset of the tracked image features within a query video sequence according to the trackability ranking order to facilitate at least one of an image-based recognition search, a video segmentation, or a pose estimation and mapping system.

38. A method of establishing a tracking feature ranking strategy comprising:
- establishing, by a tracking analysis device, a tracking region within at least one training video sequence according to a first feature detection algorithm, the at least one training video sequence having a defined feature trajectory ranking associated with a set of training features in the training video sequence;
- compiling, by the tracking analysis device, a set of feature trajectories of tracked features within the tracking region according to at least one feature tracking algorithm;
- assigning, by the tracking analysis device, each feature trajectory of the set of feature trajectories a set of saliency metrics derived from a respective training feature's trajectory through the training video sequence and based on feature property measures applied to the tracking region;
- defining, by the tracking analysis device, a ranking strategy, wherein the ranking strategy comprises determining a trackability ranking order for the tracked image features within the training video sequence using a trackability ranking function of the saliency metrics and the defined feature trajectory ranking, wherein the trackability ranking function comprises at least sorting the trajectories of the tracked image features by a result of a linear combination of the saliency metrics; and
- facilitating at least one of an image-based recognition search, a video segmentation, or a pose estimation and mapping system based on the ranking strategy.

* * * * *